United States Patent [19]

Oldham et al.

[11] 3,855,350

[45] Dec. 17, 1974

[54] POLYAMIDES AND POLYOXAMIDES COPOLYMERIZED IN THE PRESENCE OF A GLYCOL

[75] Inventors: Joseph Oldham, Blackley, England; Frederick Keith Duxbury, deceased, late of Blackley, England by Jean Duxbury, administratrix

[73] Assignee: Imperial Chemical Industries Limited, London, England

[22] Filed: Dec. 22, 1971

[21] Appl. No.: 211,122

[30] Foreign Application Priority Data

Dec. 22, 1970  Great Britain............... 60902/70

[52] U.S. Cl....... 260/857 TW, 260/75 N, 260/78 R, 260/857 PE
[51] Int. Cl............................................. C08g 41/04
[58] Field of Search.......... 260/857 TW, 78 R, 75 N

[56] References Cited

UNITED STATES PATENTS

| | | | |
|---|---|---|---|
| 3,160,677 | 12/1964 | Duxbury................ | 260/857 TW |
| 3,553,289 | 1/1971 | Duxbury................ | 260/857 TW |
| 3,634,362 | 1/1972 | Oldham.................. | 260/78 R |
| 3,247,168 | 4/1966 | Stamatoff............... | 260/857 TW |
| 3,410,833 | 11/1968 | Schaaf................... | 260/857 TW |

*Primary Examiner*—Paul Lieberman
*Attorney, Agent, or Firm*—Thomas J. Morgan; Robert J. Blanke

[57] ABSTRACT

Blends and/or copolymers of polyamides and polyoxamides by condensing a diamine with an ester of oxalic acid in presence of a glycol of formula $HOCH_2.CHOH.R$ where R is hydrogen lower alkyl or hydroxymethyl, and a polyamide.

29 Claims, No Drawings

POLYAMIDES AND POLYOXAMIDES COPOLYMERIZED IN THE PRESENCE OF A GLYCOL

This invention relates to polyamides and more especially to blends and copolymers of polyamides and polyoxamides and to methods for their manufacture.

It is already known to prepare blends of polyamides and polyoxamides by blending the two components together in the molten state. It has also been proposed in our British Pat. Specification No. 1252073, to obtain polyoxamides of sufficiently high molecular weight to be capable of being melt spun into filaments by carrying out the condensation of a diamine with an ester of oxalic acid in the presence of ethylene glycol or certain substituted derivatives thereof.

We have now found a novel and advantageous method of preparing blends and/or copolymers of polyamides and polyoxamides which comprises carrying out the condensation of a diamine with an ester of oxalic acid in the presence of a solution or mixture of a polyamide with ethylene glycol or certain substituted derivatives thereof.

According to our invention we provide a process for the manufacture of blends and/or copolymers of polyamides and polyoxamides which comprises condensing a diamine with an ester of oxalic acid by heating them in the presence of a glycol and a polyamide, the glycol having the general formula -

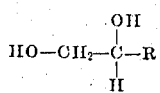

in which R represents a hydrogen atom, a lower alkyl group having from 1 to 4 carbon atoms or a hydroxymethyl group.

The diamines which may be used in the condensation with the oxalic esters may be any diamine customarily used in the manufacture of polyamides by reaction with dicarboxylic acids or amide-forming derivatives thereof. Suitable diamines include aliphatic, cycloaliphatic or araliphatic diamines, especially alkylene diamines and particularly those having at least two carbon atoms joining the amino groups thereof. Suitable diamines include those represented by the formula $NH_2 \cdot C_n H_{2n} \cdot NH_2$ or by the formula $NH_2(CH_2)_n NH_2$ where $n$ is an integer from 2 to 16. As examples of suitable diamines there may be mentioned ethylene diamine, trimethylenediamine, 1,2-propylenediamine, tetramethylenediamine, pentamethylenediamine, hexamethylenediamine, 2,2-dimethylpentamethylenediamine, 2,2,4- and 2,4,4-trimethylhexamethylenediamine, octamethylenediamine, decamethylenediamine, dodecamethylenediamine, hexadecamethylenediamine, 4,4'-diaminodicyclohexylmethane, 3,3,5-trimethyl-5-aminomethylcyclohexylamine and m- and p- xylylenediamine. Mixtures of diamines may be used if desired.

The esters of oxalic acid which take part in the condensation with the diamines are usually aliphatic esters, especially the dialkyl esters and particularly the di-lower alkyl esters containing up to 4 carbon atoms in the alcoholic portion. As particular examples of such esters there may be mentioned dimethyl, diethyl, di-isopropyl, di-n-propyl and di-n-butyl oxalate. Diethyl or di-n-butyl oxalate is particularly preferred. Diphenyl oxalate may also be used.

The glycols in the presence of which the diamines and oxalic esters are condensed by heating have the formula $CH_2OH \cdot CHOH \cdot R$ in which R is a hydrogen atom, a lower alkyl group having up to 4 carbon atoms or a hydroxymethyl group. Ethylene glycol is preferred, but, for example, 1,2-propylene glycol or 1,2-butylene glycol may be used.

As polyamides there may be used any polyamide it is desired to blend or copolymerise with a polyoxamide. Such polyamides are the condensation products which contain recurring amide groups as integral parts of the main polymer chain and are known generically as the nylons. These are obtained in known manner by polymerising an amino carboxylic acid or its derived lactam in which there are at least two carbon atoms between the amino and carboxylic acid group; or by condensing substantially equimolecular proportions of a diamine which contains at least two carbon atoms between the amino groups with a dicarboxylic acid other than oxalic acid.

The aminocarboxylic acids are preferably those having between 2 and 16 carbon atoms between the amino and carboxylic acid groups, their derived lactams forming a ring containing from 2 to 16 carbon atoms in addition to a —CO.NH— group. As particular examples of such compounds there may be mentioned ε-aminocaproic acid, caprolactam, butyrolactam, pivalolactam, capryllactam, enantholactam, undecanolactam and dodecanolactam, which are used in the process of our invention in the form of their polymers.

Diamines which may be condensed with dicarboxylic acids other than oxalic acid to give polyamides for use in the process of our invention may be any of those mentioned above for use in the condensation with the oxalic ester. Suitable dicarboxylic acids include aliphatic dicarboxylic acids especially alkylene dicarboxylic containing from 2 to 16 carbon atoms in the alkylene residue. As examples of such dicarboxylic acids there may be mentioned succinic acid, glutaric acid, adipic acid, pimelic acid, suberic acid, azelaic acid, sebacic acid, undecanedioic acid and dodecanedioic acid. Aromatic dicarboxylic acids may also be used, for example isophthalic acid or terephthalic acid.

As well as polyamides, mixtures of polyamides or copolyamides may be used in the process of our invention. As examples of suitable polyamides there may be mentioned polyhexamethylene adipamide, polyhexamethylene sebacamide, polyhexamethylene azelaamide, polyhexamethylene isophthalamide, polyhexamethylene terephthalamide, poly-m-xylylene adipamide, polycaprolactam, polyundecanolactam, polydodecanolactam and copolymers of hexamethylene adipamide and caprolactam.

In the process of our invention the diamine and the oxalic ester are heated in the presence of the glycol and the polyamide. The temperature of heating is preferably at least high enough for the polyamide to dissolve appreciably in the glycol. We have found that when polyamides are dissolved in the glycol, glycolysis occurs, that is to say amide groups of the polymer chain are split with the formation of glycol ester end groups and amino end groups; for example in the case of ethylene glycol the following reaction takes place -

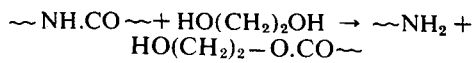

The temperature at which this reaction takes place to an appreciable extent will vary somewhat depending on the nature of the glycol and the particular polyamide used. In the case of ethylene glycol and polyhexamethylene adipamide a temperature greater than 160°C is necessary for appreciable solution of the polyamide in the glycol. Contrary to the behaviour of the polyamides, however, when polyoxamide-forming components are heated in the glycol at these temperatures polycondensation to form the polyoxamide proceeds smoothly.

A preferred method of carrying out the process of our invention is to heat the polyamide in the glycol until partial or total solution occurs, then add the oxalic ester, and after an interval add the diamine and continue heating until the desired reaction has taken place. When the oxalic ester is added to the solution of the polyamide in the glycol, reaction of the oxalic ester with the amino groups formed during solution of the polyamide occurs, with liberation of the alcohol of the oxalic ester. The interval between adding the oxalic ester and subsequently adding the diamine in our preferred process may vary but is normally between 5 minutes and 5 hours.

The total time of heating may vary widely depending on the nature of the reactants and the temperature employed. Times of heating normally fall within the range of 3 hours to 24 hours. Longer times of heating are, of course, possible, but degradation of the resulting polymer is liable to occur if heating is unduly prolonged. Temperatures of heating may range from about 150°C up to 200°C or higher. It is an advantage of our invention, however, that the products are obtained at only moderately elevated temperatures, whereas previous methods of obtaining blends of polyamides and polyoxamides required mixing the components at a temperature above their melting points, that is to say at temperatures within the region of 200° to 330°C. As a result of products being formed at lower temperatures there is less risk of degradation and products of better colour are obtained. In the process of our invention, therefore, we prefer to heat the reactants at temperatures not exceeding 180°C.

The process of our invention also has the advantage over a melt blending process that a more homogeneous product is obtained.

After the reaction is complete the product may be isolated, for example, by cooling to about 120°C, filtering and washing, for example with water and/or methanol, and drying. Alternatively, the reaction mixture may be poured into water and the product filtered off, washed and dried.

Because of the glycolysis of the polyamide in the process of our invention, the product will normally contain some copolymer in addition to polyamide and polyoxamide blended together.

The diamine and oxalic ester are normally used in substantially equivalent amounts. The proportion of polyamide to polyoxamide forming components may vary between 1:10 and 10:1 by weight. The proportion of glycol to the total of polyamide and polyoxamide-forming components may vary between 30/1 and 2/1 by weight, with proportions between 25/1 and 4/1 being preferred.

The blends and/or copolymers of polyamides and polyoxamides may be melt spun into filaments or fibres, and may be formed into shaped articles by moulding, extrusion or other shaping processes.

We have found that polyoxamides containing from 10 to 25% by weight of polyamide made by the process of our invention yield fibres having physical properties similar to those of fibres obtained from the polyoxamides themselves but which are easier to spin and have improved affinity for dyestuffs, especially acid dyestuffs.

Particularly useful products of the process of our invention are the products obtained when the diamine is a mixture of trimethylhexamethylene diamine and hexamethylene diamine, especially in the molar proportions of from 60/40 to 20/80, and the polyamide is polyhexamethylene adipamide, the proportion of polyamide being from 10% to 80% by weight. The trimethylhexamethylene diamine is preferably a mixture of the 2,2,4 and 2,4,4-isomers in approximately equal proportions. Also particularly useful are the products obtained when the diamine is hexamethylene diamine and the polyamide is polyhexamethylene adipamide, the proportion of polyamide being from 60% to 80% by weight.

If desired the products of the process of our invention may contain additives, which may conveniently be added to the ingredients before or during the reaction, for example delustrants such as titanium dioxide, pigments such as carbon black or copper phthalocyanine, heat stabilisers, light stabilisers and molecular weight regulators.

The invention is illustrated but not limited by the following Examples in which the parts and percentages are by weight.

EXAMPLE 1

152 Parts of nylon 6,6 polymer (polyhexamethylene adipamide) (inherent viscosity 1.06 in concentrated sulphuric acid) were dissolved in 2,500 parts of ethylene glycol by stirring at 180°C for 30 minutes. The solution was cooled to 150°C and 365.5 parts of diethyl oxalate added followed by 16 parts of a 10% w/w dispersion of titanium dioxide in ethylene glycol and 0.5 parts of zinc oxide. After 10 minutes 451.1 parts of diamine mixture was added over 12 minutes.

The diamine mixture consisted of 159.6 parts of mixed 2,2,4- and 2,4,4-trimethylhexamethylene diamine (50/50 ratio) and 291.5 parts of a 60% by weight methyl alcohol solution of hexamethylene diamine.

The temperature was raised to 160°C over 1 hour whilst the alcohols added and formed in the reaction are distilled off. After heating at 160 – 165°C for 3 hours the reaction mixture was cooled to 100°C and poured into water. The precipitated product was filtered, washed free from glycol with water and methyl alcohol and dried. The product had an inherent viscosity (IV) in sulphuric acid of 0.68, amine end value 133 and a melt viscosity at 276°C of 585 poise.

The product was a trimethyl hexamethylene diamine/hexamethylene diamine (40/60) copolyoxamide containing 25% of nylon 6,6 polymer.

The product was extruded into monofil at 290°C and then spun into filaments which were drawn at a draw ratio of 4.0 to 1 over a heated pin at 140°C and a plate at 180°C.

The filaments had a tenacity of 4.6 grams per denier (g.p.d.) at 15% extension, an initial modulus of 48 g.p.d. before, and 38 g.p.d. after boiling in water for one-half hour. The work recovery was 93% and elastic recovery 97.5% after stretching 2% and relaxing. The stress decay value was 19% and shrinkage in boiling water 8.7%.

For nylon 6,6 the initial modulus was 33.0 before, and 16.6 after boiling in water, work recovery 79.9%, elastic recovery 93.4%, stress decay 40% and shrinkage in boiling water 13.7%.

For the unblended polyoxamide from 40/60 mol ratio of mixed trimethylhexamethylene diamine (TMD) and hexamethylene diamine (HMD) the fibre properties were initial modulus 49.4 before and 39.6 after boiling, work recovery 96%, elastic recovery 99%, stress decay 17.5% and shrinkage in boiling water 8.1%.

EXAMPLES 2 to 4

Products of the composition and properties given in the following table were made by the general method described in Example 1.

| Example | Mol. Ratio of TMD/HMD in copoly- oxamide segment | Wt. % nylon 6,6 in blend | Initial modulus before boiling g.p.d. | Initial modulus After boiling g.p.d | Work Recovery % | Elastic Recovery % | Stress Decay % |
|---|---|---|---|---|---|---|---|
| 2 | 40/60 | 10 | 50 | 37.6 | 94 | 98.9 | 19.7 |
| 3 | 40/60 | 50 | 43.6 | 23.6 | 86 | 94 | 27.5 |
| 4 | 40/60 | 75 | 38.4 | 23.2 | 84.6 | 95 | 35.5 |

The products of Examples 1 to 4 could be melt spun faster and with fewer fibre breakages than the 40/60 ratio copolyoxamide alone. The fibres dyed equally well with disperse dyestuffs as the copolyoxamide but to a greater depth with acid dyestuffs.

EXAMPLE 5

153 parts of nylon 6,6 were added to 3000 parts of ethylene glycol at 170°C and dissolved in 25 minutes. The solution was cooled to 160°C and 0.02 parts zinc oxide added followed by 14.6 parts of diethyl oxalate. After stirring for 3 hours at 160–165°C, 19.05 parts of a 60% solution of hexamethylene diamine in methyl alcohol was added over 15 minutes. The mixture was stirred at 165°C for 3 hours then cooled to room temperature, filtered and washed free from glycol.

The product had an I.V. of 0.57, amine end value 133, and showed peaks on a differential scanning colorimeter at 251°, 260° and 269°C but not at the oxamide peak of 339°C. It consists of 10% of polyhexamethylene oxamide incorporated in nylon 6,6.

EXAMPLE 6

This was made similarly to Example 5, but 20% of hexamethylene diamine polyoxamide (6,2) was incorporated in nylon 6,6. The product had I.V. 0.52 and peaks on a differential scanning colorimeter at 250° and 257°C.

EXAMPLE 7

40% of polyoxamide 6,2 was incorporated into nylon 6,6 as in Example 5. The product had peaks on a differential scanning colorimeter at 247°, 259° and 300°C.

The results on the differential scanning colorimeter for Examples 5 to 7 show that the polyoxamide is incorporated into the other polyamide and does not exist as a separate phase. To try to achieve this result by melt blending would require temperatures higher than 330°C with decomposition of the nylon 6,6 and the oxamide 6.2.

What we claim is:

1. A process for the manufacture of a high molecular weight composition which comprises condensing a diamine with an ester of oxalic acid in the presence of a glycol, and in the presence of from 10% to 80% by weight of a polyamide said polyamide being in solution in said glycol, the glycol having the following formula:

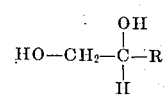

wherein R represents a hydrogen atom, a lower alkyl group having from 1 to 4 carbon atoms or a hydroxymethyl group by heating at a temperature sufficient for copolymerization of said polyamide with said glycol, but in any event at a temperature not greater than 180°C, said polyamide being a polyamide obtained by polymerizing an amino carboxylic acid or its derivative lactam in which there are at least two carbon atoms between the amino and carboxylic acid group, or by condensing substantially equimolecular proportions of a diamine which contains at least two carbon atoms between the amino groups with a dicarboxylic acid other than oxalic, the proportion of glycol to the total of said polyamide and said ester of oxalic acid being between 30:1 and 2:1 by weight acid.

2. A process according to claim 1 wherein the diamine is an aliphatic, cycloaliphatic or araliphatic diamine.

3. A process according to claim 1 wherein the diamine is an alkylene diamine.

4. A process according to claim 3 wherein the alkylene is of at least 2 carbon atoms length between the amino groups.

5. A process according to claim 4 wherein the diamine is of the formula $NH_2 \cdot C_nH_{2n} \cdot HN_2$ or $HN_2(CH_2)_n NH_2$, wherein $n$ is an integer from 2 to 16.

6. A process according to claim 1 wherein the diamine is hexamethylene diamine.

7. A process according to claim 6 wherein the polyamide is polyhexamethylene adipamide, the proportion of polyamide being from 60 to 80% by weight.

8. A process according to claim 1 wherein the diamine is a mixture of trimethylhexamethylene diamine and hexamethylene diamine and the polyamide is polyhexamethylene adipamide.

9. A process according to claim 8 wherein the molar proportions of the two diamines are from 60/40 to 20/80.

10. A process according to claim 8 in which the trimethylhexamethylene diamine is a mixture of the 2:2:4- and 2:4:4-isomers in approximately equal proportions.

11. A process according to claim 1 wherein the ester of oxalic acid is a dialkyl ester.

12. A process according to claim 11 wherein alkyl contains 2 or 4 carbon atoms.

13. A process according to claim 11 wherein alkyl is ethyl or n-butyl.

14. A process according to claim 1 wherein the ester of oxalic acid is diphenyl oxalate.

15. A process according to claim 1 wherein in the glycol R is methyl or ethyl.

16. A process according to claim 1 wherein in the glycol R is hydrogen.

17. A process according to claim 1 wherein the polyamide used as reactant is derived from an aminocarboxylic acid having a chain of from 2 to 16 carbon atoms between the amino and carboxyl groups.

18. A process according to claim 1 wherein the polyamide used as reactant is derived from a diamine of the formula $NH_2.C_nH_{2n}.NH_2$ or $HN_2(CH_2)_nNH_2$, where $n$ is an integer from 2 to 16 and a dicarboxylic acid.

19. A process according to claim 18 wherein the diamine is hexamethylene diamine.

20. A process according to claim 18 wherein the dicarboxylic acid is an alkylene dicarboxylic acid in which the alkylene is from 2 to 16 carbon atoms.

21. A process according to claim 18 wherein the dicarboxylic acid is an aromatic dicarboxylic acid.

22. A process according to claim 21 wherein the aromatic dicarboxylic acid is isophthalic acid or terephthalic acid.

23. A process according to claim 1 wherein the glycol is ethylene glycol, the polyamide is polyhexamethylene adipamide and the temperature at which the reaction is carried out is at least 160°C.

24. A process according to claim 1 wherein the interval of time between addition of the oxalic ester and of the diamine is at least 5 minutes and not exceeding 5 hours.

25. A process according to claim 1 wherein the total time of reaction is from 3 hours to 24 hours.

26. A process according to claim 1 wherein the proportion of glycol to total of polyamide and polyoxamide-forming components is from 25 to 1 to 4 to 1.

27. A proces according to claim 1 wherein the proportion of polyamide to polyoxamide forming components is from 1 to 10 to 10 to 1.

28. A process according to claim 1 wherein said high molecular weight composition contains from 10% to 25% by weight of polyamide.

29. The process of claim 1 wherein said high molecular weight composition is hot-melt extruded.

* * * * *

PO-1050
(5/69)

UNITED STATES PATENT OFFICE
CERTIFICATE OF CORRECTION

Patent No. __3,855,350__          Dated __December 17, 1974__

Inventor(s) __Joseph Oldham, Frederick Keith Duxbury__

It is certified that error appears in the above-identified patent and that said Letters Patent are hereby corrected as shown below:

Claim 1, ultimate line, delete the word "acid".

Claim 5, line 2, cancel the formula "$NH_2 \cdot C_nH_{2n} \cdot HN_2$" and substitute therefore the formula -- $NH_2 \cdot C_nH_{2n} \cdot NH_2$ --.

Claim 5, line 3, cancel the formula "$HN_2(CH_2)_nNH_2$" and substitute therefore the formula -- $NH_2(CH_2)_nNH_2$ --.

Claim 18, line 3, cancel the phrase "$NH_2 \cdot C_nH_{2n} \cdot NH_2$ or $HN_2(CH_2)_nNH_2$" and substitute therefore the phrase -- $NH_2 \cdot C_nH_{2n} \cdot NH_2$ or $NH_2(CH_2)_nNH_2$ --.

Signed and sealed this 1st day of April 1975.

(SEAL)
Attest:

RUTH C. MASON
Attesting Officer

C. MARSHALL DANN
Commissioner of Patents
and Trademarks